US012622425B2

(12) United States Patent
Chung

(10) Patent No.: US 12,622,425 B2
(45) Date of Patent: May 12, 2026

(54) GUNNEL GIMBAL

(71) Applicant: Wayne Christopher Chung,
Homestead, FL (US)

(72) Inventor: Wayne Christopher Chung,
Homestead, FL (US)

( * ) Notice: Subject to any disclaimer, the term of this
patent is extended or adjusted under 35
U.S.C. 154(b) by 38 days.

(21) Appl. No.: 18/615,555

(22) Filed: Mar. 25, 2024

(65) Prior Publication Data

US 2024/0324571 A1      Oct. 3, 2024

Related U.S. Application Data

(60) Provisional application No. 63/577,072, filed on Mar.
27, 2023.

(51) Int. Cl.
A01K 97/10          (2006.01)
(52) U.S. Cl.
CPC .................................... A01K 97/10 (2013.01)
(58) Field of Classification Search
CPC .................................................... A01K 97/10
USPC .......... 248/514, 515, 520, 521, 538; 43/21.2
See application file for complete search history.

(56) References Cited

U.S. PATENT DOCUMENTS

| | | | |
|---|---|---|---|
| 2,851,234 A | 9/1958 | Scheifele | |
| 3,290,816 A | 12/1966 | Eklof | |
| 3,516,190 A | 6/1970 | Cook | |
| 3,889,908 A * | 6/1975 | Larson | A01K 97/10 |
| | | | 403/103 |
| 4,161,839 A | 7/1979 | Ward | |
| 6,357,166 B1 | 3/2002 | Malmanger et al. | |
| 6,497,067 B1 | 12/2002 | King | |
| 7,774,973 B2 | 8/2010 | Carnevali | |
| 7,926,497 B2 * | 4/2011 | Young | A45B 17/00 |
| | | | 135/20.1 |

(Continued)

FOREIGN PATENT DOCUMENTS

| | | |
|---|---|---|
| CA | 2176262 A1 | 11/1997 |
| CN | 207151681 U | 3/2018 |

(Continued)

OTHER PUBLICATIONS

International Search Report and Written Opinion, dated Jul. 10,
2024, issued by the Korean Intellectual Property Office as Interna-
tional Searching Authority (7 pages).

(Continued)

*Primary Examiner* — Zoe Tam Tran
(74) *Attorney, Agent, or Firm* — Koenig IP Works, PLLC;
Katherine Koenig

(57)          ABSTRACT

A fishing rod holder device (a gunnel gimbal) that is
configured to allow for the free pivotal and/or rotational
movement of a fishing rod while in use. In one embodiment,
the gunnel gimbal includes a rod holder, an upper rotational
plate, a lower rotational plate, and a mounting arm. The rod
holder is pivotably coupled to the upper rotational plate,
between two upright plates. The upper rotational plate is
rotationally coupled to the lower rotational plate, and the
lower rotational plate is fixedly coupled to the mounting
arm. The mounting arm is configured to engage with a
mounting structure, such as a built-in fishing rod tube within
a gunnel of a boat. A pivotal location of the rod holder and
a rotational position of the upper rotational plate are fixable
by use of detent pins.

14 Claims, 10 Drawing Sheets

(56) References Cited

U.S. PATENT DOCUMENTS

| | | | | |
|---|---|---|---|---|
| 7,941,964 | B2 | 5/2011 | Stanton | |
| 9,615,564 | B2 | 4/2017 | Liney | |
| 9,675,057 | B2 | 6/2017 | Vannieuwenhoven | |
| 10,258,026 | B2 | 4/2019 | Thomas | |
| 10,448,626 | B2 | 10/2019 | Carnevali | |
| 11,172,665 | B2 * | 11/2021 | McQuade | B63B 25/28 |
| 2003/0221358 | A1 | 12/2003 | Matlosz | |
| 2007/0089350 | A1 | 4/2007 | Elliott | |
| 2008/0078332 | A1 * | 4/2008 | Conger | A01K 1/031 |
| | | | | 119/416 |
| 2009/0145016 | A1 * | 6/2009 | Bateman | A01K 97/10 |
| | | | | 43/21.2 |
| 2009/0211141 | A1 * | 8/2009 | Marcus | A01K 97/10 |
| | | | | 43/21.2 |
| 2015/0223440 | A1 | 8/2015 | Schmaus | |
| 2020/0029544 | A1 | 1/2020 | Draper | |
| 2021/0084879 | A1 * | 3/2021 | Sarnowski | A01K 97/10 |
| 2023/0019505 | A1 | 1/2023 | Begin | |
| 2023/0232805 | A1 * | 7/2023 | Gravely, III | A01K 97/08 |
| | | | | 248/534 |

FOREIGN PATENT DOCUMENTS

| | | |
|---|---|---|
| CN | 218184817 U | 1/2023 |
| KR | 2020090012559 | 1/2009 |
| KR | 2020200000453 U | 2/2020 |
| KR | 200492201 | 8/2020 |

OTHER PUBLICATIONS

Ram Rod(R) Fishing Rod Holder with Flush Mounting Base—RAM-114-FU, available online at https://ocmounts.com/products/ram-rod%C2%AE-fishing-rod-holder-with-flush-mounting-base-ram-114-fu?variant=39483367719046&msclkid=5f013ad1e56312ecc5365f87a053561a (last accessed Mar. 25, 2024).

* cited by examiner

GUNNEL GIMBAL

CROSS-REFERENCE TO RELATED APPLICATIONS

This application is related to and claims priority to U.S. Provisional Application No. 63/577,072, filed Mar. 27, 2023, entitled GUNNEL GIMBAL, the entirety of which is incorporated herein by reference.

GOVERNMENT RIGHTS STATEMENT

N/A.

TECHNICAL FIELD

The present technology is related generally to a fishing rod holder that allows for pivotal and rotational movement of a fishing rod. In particular, the present technology is related generally to a gunnel gimbal.

BACKGROUND

A number of devices configured to hold and/or secure a fishing rod are known. Such devices include fishing rod holders that are built into a boat and/or a boat frame, fishing belts, fishing chairs, and others. However, such devices either do not allow for free pivotal and/or rotational movement of the fishing rod while fighting a fish, are expensive, must be attached to the user's body, and/or must be permanently secured to a boat or boat frame.

SUMMARY

Some embodiments advantageously provide a gunnel gimbal (fishing rod holder device) that allows for pivotal and rotational movement of a fishing rod while fighting a fish.

In one embodiment, a fishing rod holder device includes: a rod holder; a rod holder assembly, the rod holder being pivotably coupled to the rod holder assembly, the rod holder assembly including: an upper rotational plate; and a lower rotational plate, the upper rotational plate being rotationally coupled to the lower rotational plate; and a mounting arm, the mounting arm being fixedly coupled to the lower rotational plate.

In one aspect of the embodiment, the rod holder is configured to pivot about a pivotal axis, the rod holder including an elongate body having a tubular shape, the elongate body including: a first end, the first end having at least one pivotal axis aperture and a fixing element having an aperture; a second end opposite the first end, the second end being an open end; and a chamber extending between the first end and the second end.

In one aspect of the embodiment, the upper rotational plate includes a planar base portion, a first upright plate extending from the base portion, and a second upright plate extending from the base portion.

In one aspect of the embodiment, the base portion lies in a first plane and each of the first upright plate and the second upright plate extend in a plane that is at least substantially orthogonal to the base portion, the first upright plate and second upright plate being at least substantially parallel to each other.

In one aspect of the embodiment, each of the first upright plate and the second upright plate includes a plurality of pivot fixing point apertures.

In one aspect of the embodiment, the fishing rod holder device further includes a pivot point detent pin, wherein the rod holder is pivotably coupled between the first upright plate and the second upright plate when the pivot point detent pin is positioned within the at least one pivotal axis aperture and secured to each of the first upright plate and the second upright plate.

In one aspect of the embodiment, the fishing rod holder device further includes a pivot fixing detent pin, wherein the rod holder is secured at a pivotal position of the rod holder about the pivotal axis when the pivot fixing detent pin is positioned within the aperture of the fixing element, one of the plurality of pivot fixing point apertures of the first upright plate, and one of the plurality of pivot fixing point apertures of the second upright plate.

In one aspect of the embodiment, the upper rotational plate includes: a first coupling aperture at a center point of the base portion; and a first rotation fixing point aperture, the first rotation fixing point aperture is radially offset from the center point.

In one embodiment, the lower rotational plate includes: a second coupling aperture at a center point of the lower rotational plate; and a plurality of second rotation fixing point apertures, the first rotation fixing point aperture being configured to be aligned with any of the plurality of second rotation fixing point apertures depending on a rotational position of the upper rotational plate relative to the lower rotational plate.

In one aspect of the embodiment, the lower rotational plate has a circular shape, the plurality of second rotation fixing point apertures being arranged around in a circle proximate an edge of the lower rotational plate.

In one aspect of the embodiment, the fishing rod holder device further includes a rotation fixing detent pin, the upper rotational plate being rotatable about a rotational axis, wherein the rod holder and the upper rotational plate are secured at a rotational position about the rotational axis when the rotation fixing detent pin is positioned within the first rotation fixing point aperture of the upper rotational plate and one of the plurality of second rotation fixing point apertures of the lower rotational plate.

In one aspect of the embodiment, the upper rotational plate and the lower rotational plate are coupled together by a bolt extending through a center point of each of the upper rotational plate and the lower rotational plate.

In one aspect of the embodiment, the mounting arm includes a first portion having a first longitudinal axis and a second portion having a second longitudinal axis, the second longitudinal axis being different than the first longitudinal axis.

In one aspect of the embodiment, the second longitudinal axis is oriented at an angle to the first longitudinal axis, the angle being approximately 150°.

In one aspect of the embodiment, the first portion is fixedly connected to the lower rotational plate, such that the upper rotational plate is rotatable relative to the lower rotational plate and the mounting arm.

In one embodiment, a fishing rod holder device includes: a rod holder, the rod holder including a tubular elongate body, the elongate body including a first end, a second end opposite the first end, and a chamber therebetween, the first end having two pivotal axis apertures and a fixing element having an aperture, the second end being a free end having an opening that is in communication with the chamber; and a rod holder assembly, the rod holder assembly including: an upper rotational plate, the upper rotational plate including a planar base portion, a first upright plate extending upward from the base portion, and a second upright plate extending upward from the base portion, the first upright plate and the second upright plate being parallel to each other, each of the first upright plate and the second upright plate having a plurality of pivot fixing point apertures, the base portion including a first rotation fixing point aperture; and a lower rotational plate, the upper rotational plate being coupled to the lower rotational plate and being movable relative to the lower rotational plate about a rotational axis, the rotational axis extending through a center point of each of the upper rotational plate and the lower rotational plate, the lower rotational plate including a plurality of second rotation fixing point apertures. In some aspects of the embodiment: the rod holder being pivotably coupled between the first upright plate and the second upright plate via a first detent pin extending through the two pivotal axis apertures of the elongate body; the rod holder being secured at a pivotal position about the pivotal axis via a second detent pin extending through one of the plurality of pivot fixing point apertures of the first upright plate, the aperture of the fixing element, and one of the plurality of pivot fixing point apertures of the second upright plate; and the rod holder and the upper rotational plate being a rod holder subassembly, the rod holder subassembly being secured at a rotational position about the rotational axis via a third detent pin extending through the first rotation fixing point aperture of the upper rotational plate and one of the plurality of second rotation fixing point apertures of the lower rotational plate.

In one aspect of the embodiment, the fishing rod holder device further includes a mounting arm, the mounting arm including: a first portion having a first longitudinal axis; and a second portion having a second longitudinal axis, the second longitudinal axis being oriented at an angle to the first longitudinal axis, the angle being between approximately 110° and approximately 160°.

In one embodiment, a method of fishing with a fishing rod holder device, the fishing rod holder device including a rod holder subassembly, a lower rotational plate, and a mounting arm, includes the steps of: inserting at least a portion of a butt of a fishing pole into a rod holder of the rod holder subassembly, the rod holder subassembly including the rod holder and an upper rotational plate, the upper rotational plate having two upright plates, the rod holder being pivotably coupled to and between the two upright plates such that the rod holder is movable about a pivotal axis, the upper rotational plate being rotatable about a rotational axis relative to the lower rotational plate; inserting at least a portion of the mounting arm into a fishing rod tube that is recessed within a boat gunnel; and allowing the fishing rod and fishing rod holder to freely pivot about the pivotal axis and allowing the fishing rod and rod holder subassembly to freely rotate about the rotational axis.

In one aspect of the embodiment, the method further includes the step of: inserting a detent pin between the two upright plates to secure the fishing rod and the rod holder at a pivotal position about the pivotal axis.

In one aspect of the embodiment, the method further includes the step of: inserting a detent pin between the upper rotational plate and the lower rotational plate to secure the fishing rod and the rod holder subassembly at a rotational position about the rotational axis.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
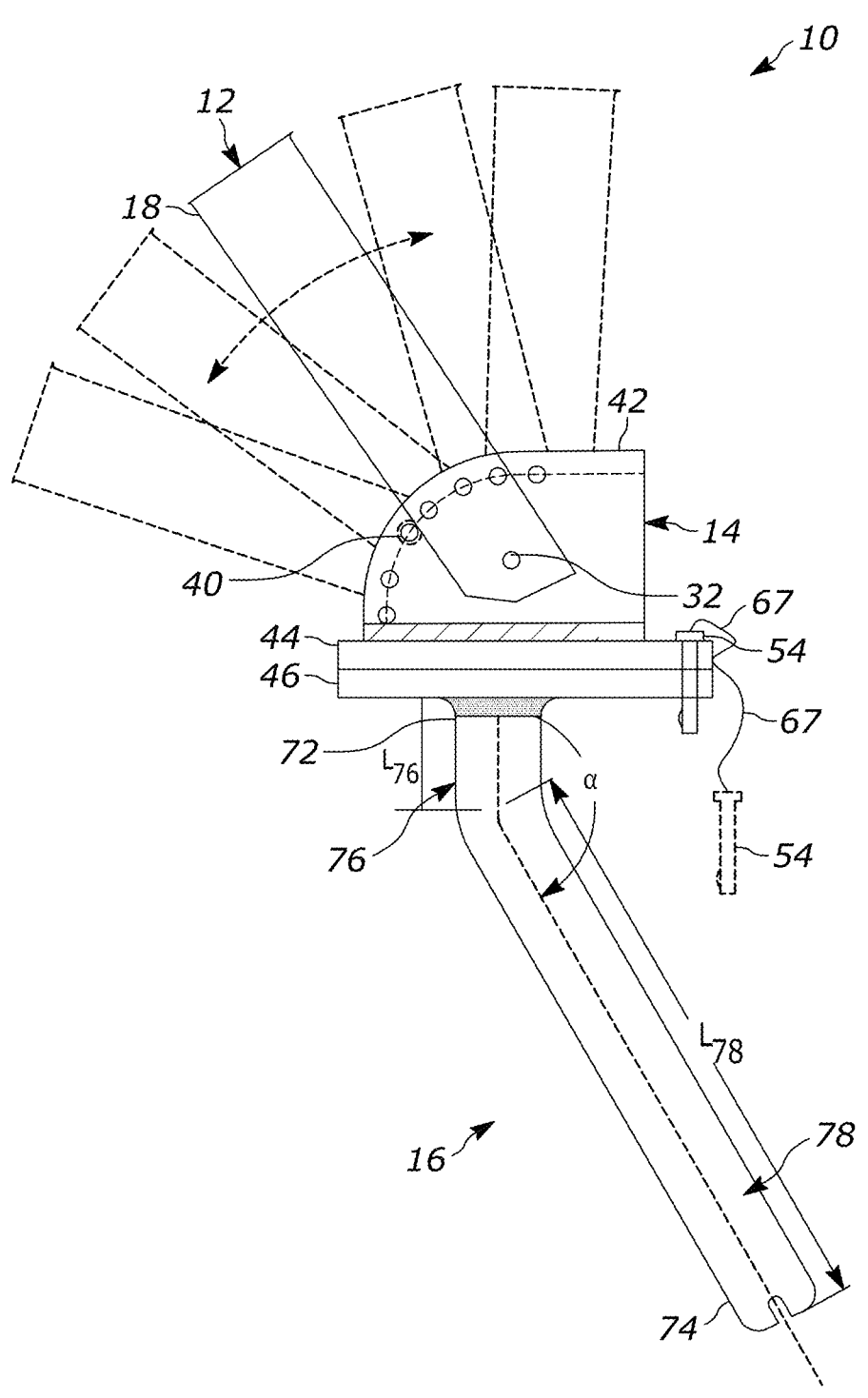
FIG. 1 shows a side view of a gunnel gimbal, illustrating pivotal movement of a rod holder of the gunnel gimbal, accordance with the present disclosure.

Before describing in detail exemplary embodiments, it is noted that the embodiments reside primarily in combinations of apparatus components and steps related to use of a fishing rod holder device (a gunnel gimbal). Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Figure 2:
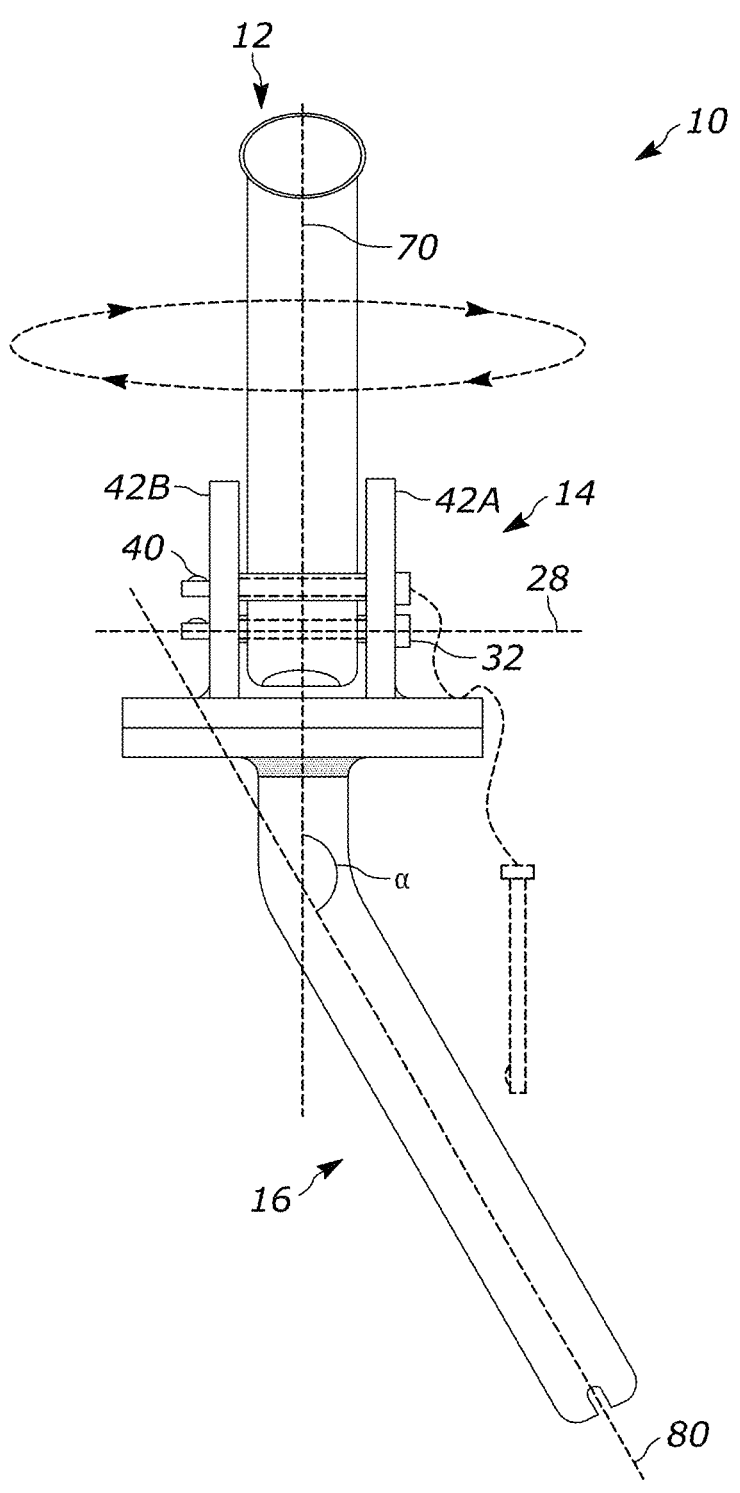
FIG. 2 shows a side view of the gunnel gimbal, illustrating rotational movement of a rod holder assembly of the gunnel gimbal, in accordance with the present disclosure.

Referring now to the figures in which like reference designators are used for like elements, a fishing pole holder device is shown in the figures. The fishing pole holder device is referred to herein as a gunnel gimbal because the device may be used with a built-in fishing rod holder of a boat, such as a recessed fishing rod tube in the boat's gunnel, and because the device is configured as a gimbal, in that its configuration allow for the free pivotal and rotational movement of a fishing pole that is held or mounted therein or thereto. The fishing pole holder device also may be selectively locked in any of a variety of positions by the user with the use of one or more pins or rods to prevent free movement of the device, as discussed in greater detail below. The gunnel gimbal may be configured to be used with, in, or on a variety of mounting surfaces and/or structures, and is not limited to use within a gunnel rod holder tube of a boat. FIGS. 1 and 2. FIG. 1 shows a side view of the gunnel gimbal 10 with pivotal movement of a rod holder 12, and FIG. 2 shows a side view of the gunnel gimbal 10 (and a front view of a rod holder assembly 14 of the gunnel gimbal 10) with rotational movement of the rod holder assembly 14. In one embodiment, the gunnel gimbal 10 is a device that is configured to hold or support a fishing rod while the fishing rod is in use, and is also configured to at least partially rest or be contained within a fishing rod mount, including, but not limited to, a fishing rod holder that is recessed within a boat gunnel.

Continuing to refer to FIGS. 1 and 2, in one embodiment the gunnel gimbal 10 generally includes a rod holder 12 that is pivotably coupled to a rod holder assembly 14, and a mounting arm 16. In one embodiment, the gunnel gimbal 10 includes a first portion that includes the rod holder 12 and the rod holder assembly 14 and a second portion that includes the mounting arm 16.

Figure 3:
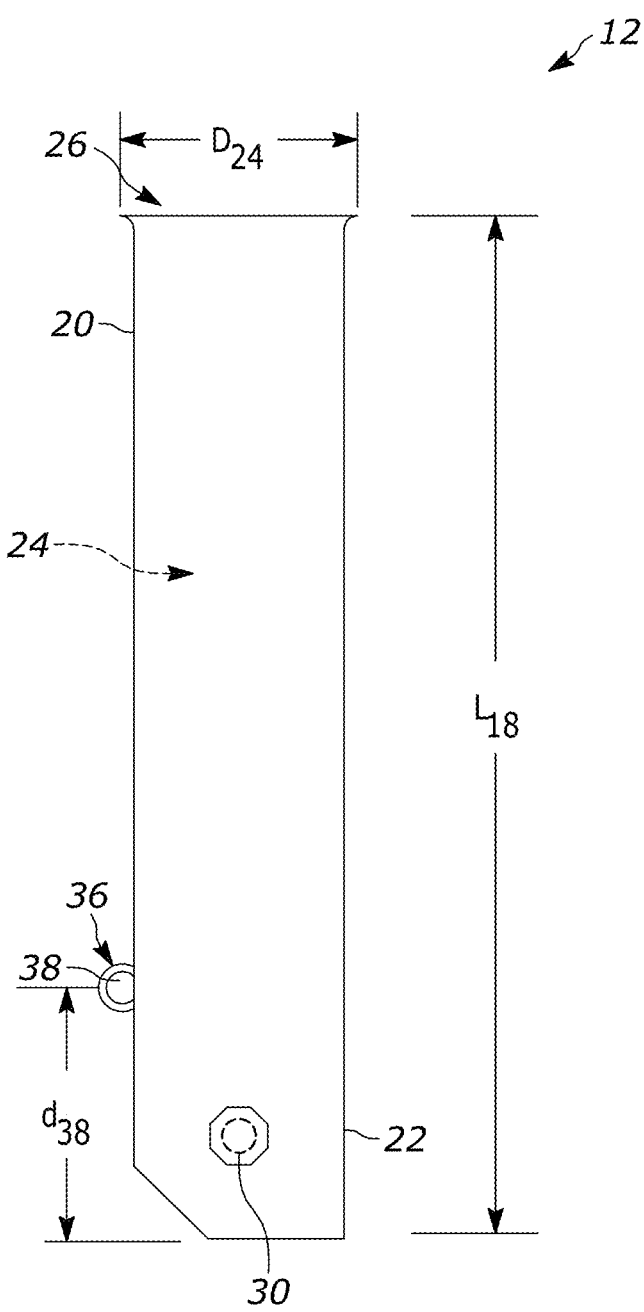
FIG. 3 shows a side view of a rod holder of the gunnel gimbal, in accordance with the present disclosure.
Figure 8:
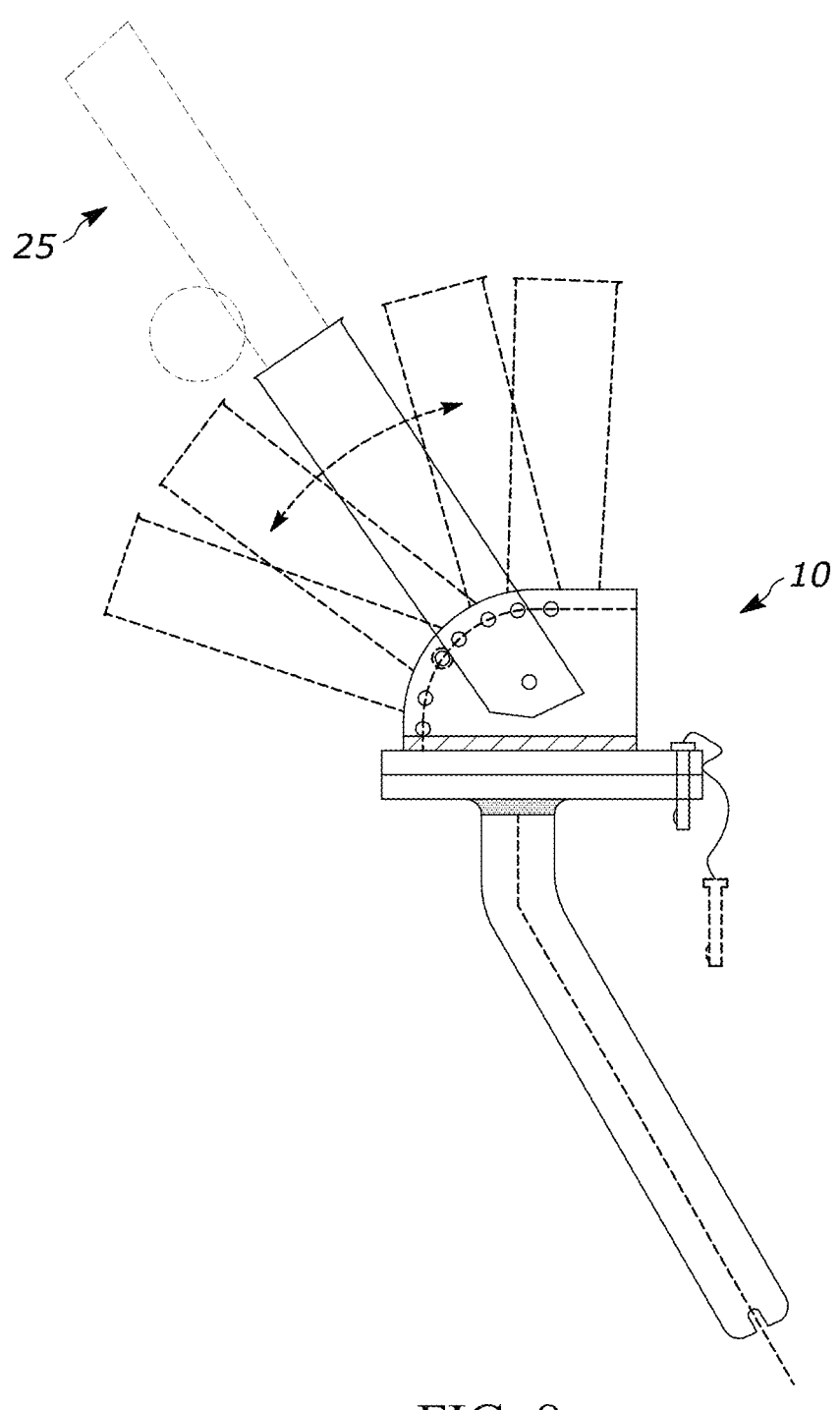
FIG. 8 shows a side view of the gunnel gimbal with an exemplary fishing rod supported within the gunnel gimbal (fishing rod shown in dashed lines), in accordance with the present disclosure.

Referring now to FIG. 3, and with reference to FIG. 8, the rod holder 12 is shown separated from the rod holder assembly 14. In one embodiment, the rod holder 12 includes an elongate body 18 that is tubular or at least substantially tubular in shape. In one embodiment, the elongate body 18 includes a first end 20, a second end 22 opposite the first end 20, and a chamber 24 therebetween that is sized and configured to receive and retain at least a portion of a fishing rod 25, such as at least a portion of rod butt and/or of a rod grip (for example, as shown in FIG. 8). When the gunnel gimbal 10 is in use, the first end 20 of the rod holder 12 is a distal end and the second end 22 of the rod holder 12 is a proximal end. In one embodiment, at least a portion of the chamber 24 within the elongate body 18 has a diameter $D_{24}$ that is approximately 2.0 inches (±0.5 inch). In some embodiments, the rod holder 12 is composed of a rigid material, such as metal (including, but not limited to, aluminum, stainless steel, and/or titanium), wood, polymer, or plastic. In one non-limiting example, the elongate body 18 has a length $L_{18}$ of approximately 9.5 inches (±1.0 inch).

Continuing to refer to FIG. 3, in one embodiment the first end 20 of the elongate body 18 is an open end that defines an opening 26 that is sized and configured to receive at least a portion of the fishing rod and that is in communication with the chamber 24 within the elongate body 18. In one embodiment, the opening 26 has a diameter that is the same as, or approximately the same as, the diameter of the chamber 24 within the elongate body 18.

Continuing to refer to FIG. 3, and with reference to FIGS. 1 and 2, in one embodiment the second end 22 of the elongate body 18 is configured to be pivotably coupled to the rod holder assembly 14. The second end 22 of the elongate body 18 may be an open end, a closed end, or a partially open end. In one embodiment, the elongate body 18 is pivotably coupled to the rod holder assembly 14 such that the elongate body 18 pivots along a pivotal axis (for example, as shown in FIG. 1). The second end 22 of the elongate body 18 defines or includes at least one pivotal axis aperture 30 that extends through at least a portion of the elongate body 18 and is sized and configured to at least partially accept a first detent pin 32 (the first detent pin 32 is also referred to herein as a pivot point detent pin). In one embodiment, the first detent pin is permanently or removably coupled to the rod holder assembly. In one embodiment, the elongate body 18 includes a first pivotal axis aperture 30 on a first side of the elongate body 18 and a second pivotal axis aperture 30 on a second side of the elongate body 18, opposite the first pivotal axis aperture 30, which allows the first detent pin 32 to be inserted through the rod holder assembly 14 and the rod holder 12 (for example, as shown in FIG. 2) to allow the rod holder 12 to pivot along the pivotal axis 28. As is discussed in greater detail below, the first detent pin 32 is sized and configured to be inserted not only through the pivotal axis apertures 30 of the rod holder 12, but also through any of a plurality of pivot fixing point apertures 34 in the rod holder assembly 14. The first detent pin 32 may be permanently or removably inserted into the rod holder 12 to pivotably couple the rod holder 12 to the rod holder assembly 14. In some embodiments, the first detent pin 32 is composed of a rigid material, such as metal, wood, polymer, or plastic.

Continuing to refer to FIG. 3, in one embodiment the second end 22 of the elongate body 18 further includes a fixing element 36 coupled to the elongate body 18. In one embodiment, the fixing element 36 is an eyelet, a rigid loop, or a tube attached to, extending from, or otherwise coupled to the second end 22 of the elongate body 18, at a point between the pivotal axis 28 and the opening 26 of the first end 20 of the elongate body 18. In one embodiment, the fixing element 36 includes or defines an aperture 38 that is sized and configured to allow at least a portion of a second detent pin 40 to pass therethrough (the second detent pin 40 is also referred to herein as a pivot fixing detent pin). In one non-limiting example, the center of the aperture 38 is located at a distance $d_{38}$ of approximately 2.5 inches (±0.5 inch) from the end of the first end 20 of the elongate body 18. In one embodiment, when the rod holder 12 is coupled to the rod holder assembly 14, the fixing element 36 is sized and configured to be aligned between upright plates 42 of the rod holder assembly 14 to allow the second detent pin 40 to pass through both the rod holder assembly 14 and the aperture 38 of the fixing element 36 to allow the user to set an angle of rotation of the rod holder 12 within the rod holder assembly 14 and secure the rod holder 12 at that location during use. Alternatively, the user may insert the second detent pin 40 between the first and second upright plates 42A, 42B, in front of the rod holder 12 but not through the aperture 38 of the fixing element 36. In that case, the rod holder 12 is freely movable in one direction (away from the second detent pin 40), but movement in the opposite direction will be limited by the fixed location of the second detent pin 40. As is described in greater detail below, in one embodiment the diameter of the aperture 38 of the fixing element 36 is the same as, or approximately the same as, a diameter as one or more of the plurality of pivot fixing point apertures 34 of the upright plates 42 of the rod holder assembly 14.

Figure 4:
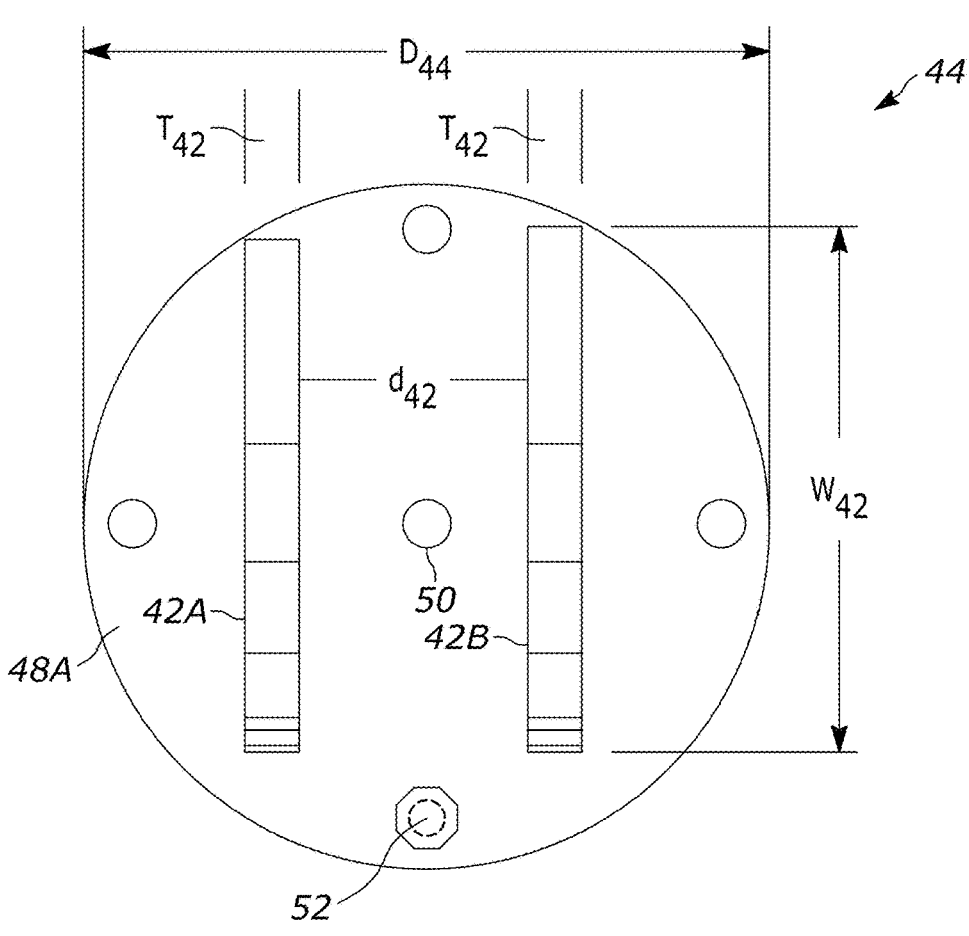
FIG. 4 shows a plan view of an upper rotational plate of the gunnel gimbal, in accordance with the present disclosure.
Figure 5:
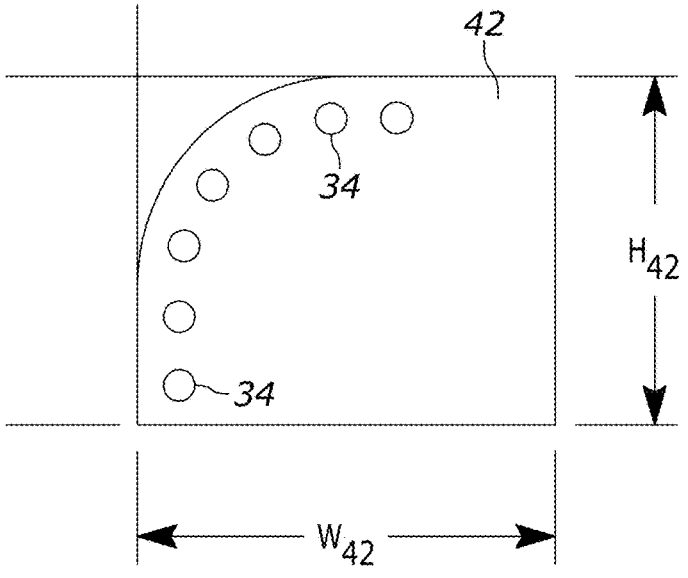
FIG. 5 shows a side view of an upright plate of the upper rotational plate of the gunnel gimbal, in accordance with the present disclosure.
Figure 6:
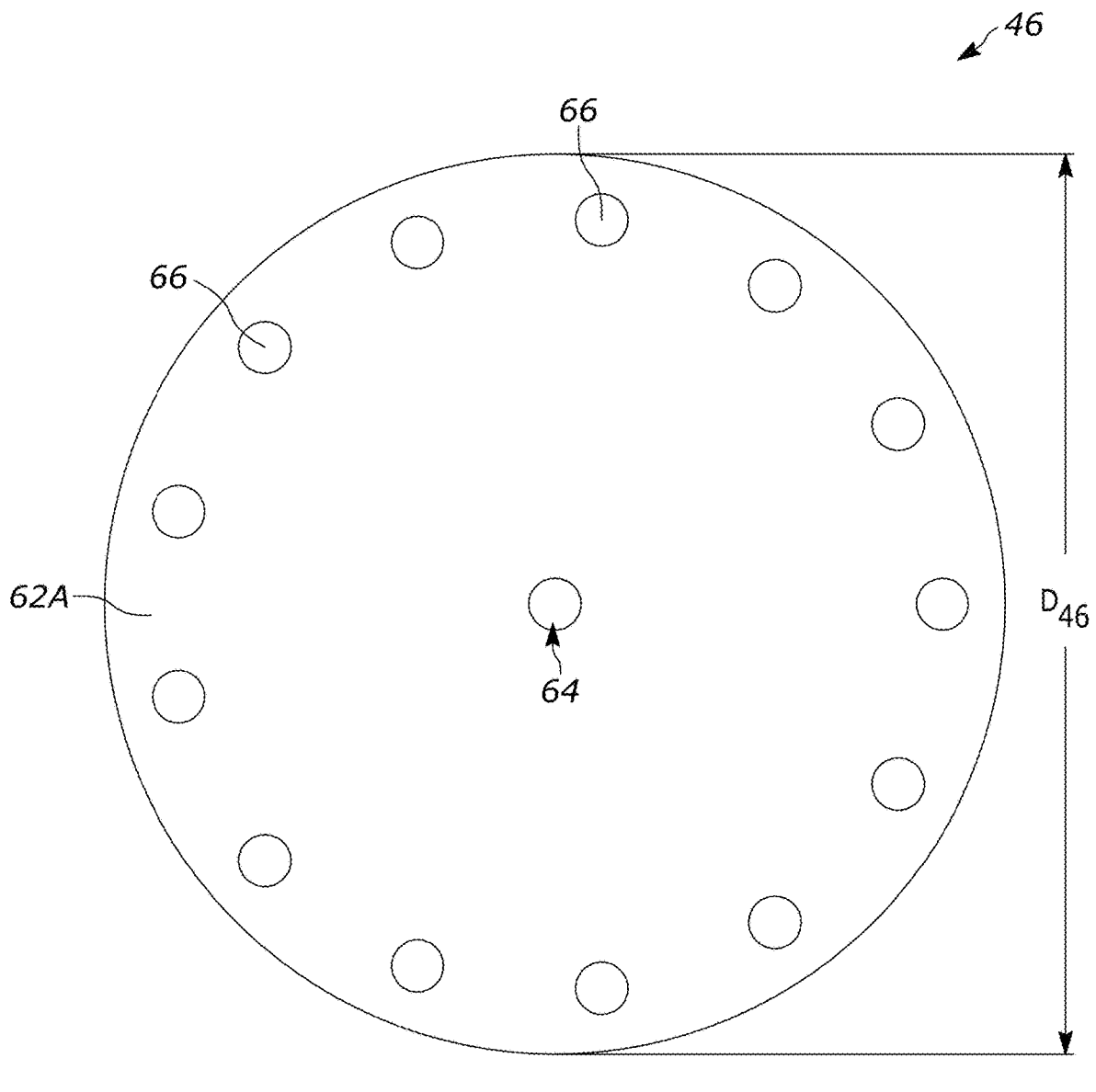
FIG. 6 shows a plan view of a lower rotational plate of the gunnel gimbal, in accordance with the present disclosure.

Referring now to FIGS. 4-6, the rod holder assembly 14 generally includes a first or upper rotational plate 44 and a second or lower rotational plate 46 that are rotationally coupled to each other. A top view of the upper rotational plate 44 is shown in FIG. 4 and a side view of a portion of the upper rotational plate 44 is shown in FIG. 5. A top view of the lower rotational plate 46 is shown in FIG. 6. As is discussed in greater detail below, the upper rotational plate 44, and the rod holder 12 coupled to the upper rotational plate 44, is rotatable relative to the lower rotational plate 46. Therefore, the rod holder 12 and the upper rotational plate are referred to herein as a rod holder subassembly.

Referring to FIGS. 4 and 5, the upper rotational plate 44 is shown in greater detail. In one embodiment, the upper rotational plate 44 includes a first or upper face 48A and a second or lower face 48B opposite the upper face 48A. In one embodiment, the upper rotational plate 44 includes a planar base portion that lies in a first plane and a first upright plate 42A and a second upright plate 42B, each of the first and second upright plates 42A, 42B extending in a plane that is different than the plane of the base portion. In one embodiment, the base portion of the upper rotational plate 44 has a circular shape; however, it will be understood that other suitable shapes may be used. In one non-limiting example, the upper rotational plate 44 has a diameter $D_{44}$ of approximately 6.0 inches (±1.0 inch). In one embodiment, the upper rotational plate 44 is composed of a rigid material, such as metal (including, but not limited to, aluminum, stainless steel, and/or titanium), wood, polymer, or plastic.

Continuing to refer to FIGS. 4 and 5, in one embodiment the upper rotational plate 44 includes one or more apertures that extend all the way through the base portion of the upper rotational plate, from the upper face 48A to the lower face 48B. In one embodiment, the one or more apertures includes a first coupling aperture 50 in the center of (or at a center point of) the upper rotational plate 44. In one embodiment, the one or more apertures also includes a first rotation fixing point aperture 52 that is sized and configured to allow at least a portion of a third detent pin 54 to pass therethrough (the third detent pin 54 is also referred to herein as the rotation fixing detent pin). In one embodiment, the first rotation fixing point aperture 52 is located at or proximate an edge of the upper rotational plate 44, aligned with the centerline of the upper rotational plate 44. That is, in one embodiment the first rotation fixing point aperture 52 is radially offset from the first coupling aperture.

Continuing to refer to FIGS. 4 and 5, in one embodiment the upper rotational plate 44 includes a first upright plate 42A and a second upright plate 42B, each of which extend orthogonally, or at least substantially orthogonally (for example, $90°\pm10°$), to the upper face 48A of the upper rotational plate 44 and that are parallel, or at least substantially parallel (for example, within $\pm10°$), to each other. In one embodiment, the first upright plate 42A and the second upright plate 42B have the same size and configuration (a side view of one of the first and second plates is shown in FIG. 5). The first and second upright plates 42A, 42B may be affixed to the upper face 48A of the upper rotational plate 44 by any suitable means, including, but not limited to, welding, chemical bonding, and the like. Alternatively, in some embodiments, the upper rotational plate 44 is manufactured or formed such that the first and/or second upright plate 42A, 42B is a single, unitary piece (the first and/or second upright plate is integrated with the upper rotational plate). In one embodiment, the first upright plate 42A is located on a first side of, and within a first distance of, the centerline of the upper rotational plate 44 and the second upright plate 42B is located on a second side of, and within a second distance of, the centerline of the upper rotational plate 44. In one embodiment, the first and second distances are equal or approximately equal (that is, the first and second upright plates are equidistant from the centerline of the upper rotational plate). In one non-limiting example, each of the first and second upright plates 42A, 42B has a thickness $T_{42}$ of approximately 0.5 inch ($\pm0.25$ inch) and a width $W_{42}$ of approximately 4.5 inches ($\pm0.5$ inch). In one non-limiting example, the first and second upright plates 42A, 42B are separated from each other by a distance $d_{42}$ of approximately 2.5 inches ($\pm0.5$ inch).

Continuing to refer to FIGS. 4 and 5, and with reference to FIG. 1, in one embodiment each of the first and second upright plates 42A, 42B includes a plurality of pivot fixing point apertures 34. In one embodiment, the plurality of pivot fixing point apertures 34 are arranged along an arc, and the arc corresponds to the arc of travel of the aperture 38 of the fixing element 36 when the rod holder 12 pivots around the pivotal axis 28 (for example, as shown in FIG. 1). In one embodiment, at least a portion of an edge of each of the first and second upright plates 42A, 42B is curved to follow the arc along which the plurality of pivot fixing point apertures 34 is arranged. In one embodiment, the plurality of pivot fixing point apertures 34 of the first upright plate 42A and the plurality of pivot fixing point apertures 34 of the second upright plate 42B are aligned with each other. In one non-limiting example, each upright plate 42A, 42B has a width $W_{42}$ of approximately 4.5 inches ($\pm0.5$ inch) and a height $H_{42}$ of approximately 3.5 inch ($\pm0.5$ inch). In one embodiment, each of the first and second upright plates 42A, 42B further includes an aperture through which the first detent pin 32 may be inserted to secure the rod holder 12 to the rod holder assembly (via the upright plates 42A, 42B).

Continuing to refer to FIGS. 4 and 5, each of the plurality of pivot fixing point apertures 34 of each of the first and second upright plates 42A, 42B is sized and configured to allow at least a portion of the second detent pin 40 to pass therethrough. In one embodiment, each of the plurality of pivot fixing point apertures 34 has the same, or at least substantially the same, diameter as the aperture 38 of the fixing element 36 of the rod holder 12. Thus, the second detent pin 40 may be passed through a pivot fixing point aperture 34 of the first upright plate 42A, through the aperture 38 of the fixing element 36, and through a pivot fixing point aperture 34 of the second upright plate 42B (that is aligned with the second fixing point aperture of the first upright plate). In one embodiment, the second detent pin 40 is coupled to the gunnel gimbal 10 by a chain or string (not shown) to prevent it from becoming lost when it is disengaged from the aperture 38 of the fixing element 36 and/or a pivot fixing point aperture 34 of the rod holder assembly 14. In some embodiments, the second detent pin 40 is composed of a rigid material, such as metal, wood, polymer, or plastic.

Referring to FIG. 6, the lower rotational plate 46 is shown in greater detail. In one embodiment, the lower rotational plate 46 includes a first or upper face 62A and a second or lower face 62B opposite the upper face 62A. In one embodiment, the lower rotational plate 46 has a circular shape; however, it will be understood that other suitable shapes may be used. In one non-limiting example, the lower rotational plate 46 has a diameter $D_{46}$ of approximately 6.0 inches ($\pm1.0$ inch). In one embodiment, the lower rotational plate 46 is composed of a rigid material, such as metal (including, but not limited to, aluminum, stainless steel, and/or titanium), wood, polymer, or plastic.

Continuing to refer to FIG. 6, in one embodiment the lower rotational plate 46 includes one or more apertures that extend all the way through the lower rotational plate 46, from the upper face 62A to the lower face 62B. In one embodiment, the one or more apertures includes a second coupling aperture 64 in the center of the lower rotational plate 46, and the second coupling aperture 64 is positioned to be aligned with the first coupling aperture 50 of the upper rotational plate 44 when the rod holder assembly 14 is assembled. In one embodiment, the one or more apertures include a plurality of second rotation fixing point apertures 66, each of which being sized and configured to allow at least a portion of the third detent pin 54 to pass therethrough. In one non-limiting example, the lower rotational plate 46 includes between three and fifteen second rotation fixing point apertures 66. However, more or fewer second rotation fixing point apertures 66 may be included, depending on the desired control over rotational position of the rod holder 12. In one embodiment, the third detent pin 54 is coupled to the gunnel gimbal 10 by a chain or string 67 to prevent it from becoming lost when it is disengaged from the aperture 38 of the fixing element 36 and/or a pivot fixing point aperture 34 of the rod holder assembly 14. In some embodiments, the second detent pin 40 is composed of a rigid material, such as metal, wood, polymer, or plastic. In one embodiment, the plurality of second rotation fixing point apertures 66 are located at or proximate an edge of the lower rotational plate 46, and are arranged around a circle that follows the shape of the lower rotational plate 46. In one embodiment, although referred to herein as a rotational plate, the lower rotational plate 46 is fixedly coupled to the mounting arm 16, such as by welding, chemical bonding, or the like. In some embodiments, the lower rotational plate 46 and the mounting arm 16 are manufactured or formed as a single, unitary piece.

Figure 7:
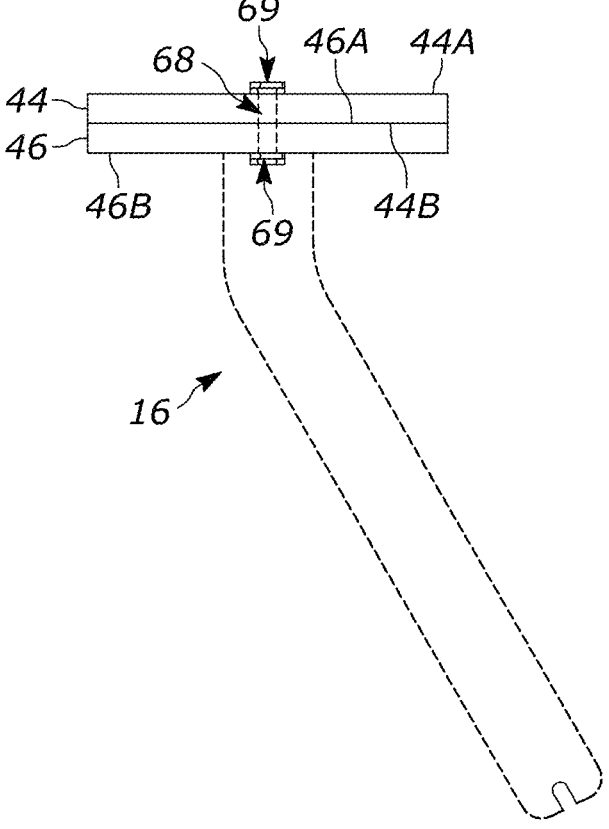
FIG. 7 shows a side view of the upper rotational plate and lower rotational plate of the gunnel gimbal coupled tougher, in accordance with the present disclosure.

Referring now to FIG. 7, the upper rotational plate 44 and the lower rotational plate 46 are shown coupled together. For ease of illustration of the coupling means, the upper rotational plate 44 is shown without the upright plates 42A, 42B. In one embodiment, the upper rotational plate 44 is stacked on the lower rotational plate 46, such that the lower face 48B (which, in one embodiment, is planar or at least substantially planar) of the upper rotational plate 44 is in contact with the upper face 62A (which, in one embodiment, is planar or at least substantially planar) of the lower rotational plate 46. In one embodiment, the upper rotational plate 44 and the lower rotational plate 46 together lie in a plane that is orthogonal, or at least substantially orthogonal, to the rotational axis 70 (for example, as shown in FIG. 2). In one embodiment, the upper rotational plate 44 and the lower rotational plate 46 are joined together by a bolt 68 extending through both the first coupling aperture 50 of the upper rotational plate 44 and the second coupling aperture 64 of the lower rotational plate 46. In one embodiment, a nut 69 is coupled to each end of the bolt to secure it within the first and second coupling apertures 50, 64. Instead of a bolt, a screw, bolt, pin, dowel, or the like may be used. In one embodiment, the bolt does not tightly couple the upper rotational plate 44 and the lower rotational plate 46, but instead allows the upper rotational plate 44 to rotate about a rotational axis 70 and relative to the lower rotational plate 46. As the rod holder assembly 14 is coupled to or integrated with the upper rotational plate 44, rotation of the upper rotational plate 44 also rotates the rod holder assembly about the rotational axis 70. In one embodiment, the upper rotational plate 44 may freely rotate 360° about the rotational axis 70. In one embodiment, the lower rotational plate 46 does not rotate relative to the mounting arm 16. Rotation of the upper rotational plate 44 relative to the lower rotational plate 46 and mounting arm 16 allows the user to orient the fishing rod, when mounted within the rod holder, in a number of directions without disengaging the fishing rod from the rod holder and/or the gunnel gimbal 10 from the gunnel rod holder or other mount to which or within with the fishing rod is secured.

Referring again to FIGS. 1 and 2, in one embodiment the mounting arm 16 extends from the lower face 62B of the lower rotational plate 46. As noted above, the mounting arm may be coupled to the lower rotational plate 46 or may be formed with the lower rotational plate 46 as a single, unitary piece. In one embodiment, the mounting arm 16 includes a first end 72 that meets, abuts, or is coupled to the lower face 62B of the lower rotational plate 46 and a second end 74 opposite the first end 72, the second end 74 being a free end. In one embodiment, the second end 72 is sized and configured to at least partially fit within a fishing rod mount, thereby securing the gunnel gimbal 10 to the fishing rod mount. In one embodiment, the mounting arm 16 includes a first portion 76 that includes the first end 72 and that is oriented along the rotational axis 70 about which the upper rotational plate 44 may be rotated. In one embodiment, the mounting arm 16 further includes a second portion 78 that includes the second end 74 and that lies along a longitudinal axis 80 that is oriented at an angle from the rotational axis

70. Put another way, in one embodiment the mounting arm 16 has a bent configuration. In one non-limiting example, the longitudinal axis 80 is oriented from the rotational axis 70 at an obtuse angle $\alpha$ (shown in FIG. 2) that is greater than 90° and less than 180°. In one embodiment, the angle $\alpha$ (shown in FIG. 2) is between approximately 110° and approximately 160° ($\pm$15°). In one non-limiting example, the $\alpha$ is approximately 150° ($\pm$15°). In one embodiment, the first portion 76 has a length $L_{76}$ that is approximately 2.0 inches ($\pm$0.5 inch) and the second portion $L_{78}$ has a length that is approximately 11 inches ($\pm$2.0 inches). In one embodiment, the second portion 78 has a length that is sufficient to securely anchor the gunnel gimbal 10 within the fishing rod mount, but still allows the gunnel gimbal 10 to be easily removed from the fishing rod mount.

During use of the gunnel gimbal 10, the rod holder 12 may be pivoted around the pivotal axis 28 (via the first detent pin 32) until the rod holder 12, and a fishing rod 25 secured therein, is oriented at the user's preferred angle relative to rotational axis 70. Once the rod holder 12 is oriented at the user's preferred angle, the user may insert the second detent pin 40 through a first pivot fixing point aperture 34 in the first upright plate 42A, then through the aperture 38 of the fixing element 36, and then through a second pivot fixing point aperture 34 in the second upright plate 42B to prevent further movement of the rod holder 12 about the pivotal axis 28 (for example, as shown in FIG. 2). Alternatively, the user may disengage the second detent pin 40 from the rod holder assembly 14 to allow the rod holder 12 to freely move about the pivotal axis 28 during use. In this case, the user may allow the second detent pin 40 to hang freely from the chain or string.

Further, during use the gunnel gimbal 10, the rod holder assembly 14 may be rotated around the rotational axis 70 (via the bolt 68 coupling the upper rotational plate 44, with rod holder assembly 14, and the lower rotational plate 46) until the rod holder 12, and a fishing rod 25 secured therein, is oriented at the user's preferred angle of rotation about the rotational axis 70. Once the rod holder 12 is oriented at the user's preferred angle, the user may insert the third detent pin 54 through the first rotation fixing point aperture 52 in the upper rotational plate 44 and then through one of the plurality of second rotation fixing point apertures 66 of the lower rotational plate 46 to prevent further movement of the rod holder assembly 14 about the rotational axis (for example, as shown in FIG. 2). Alternatively, the user may disengage the third detent pin 54 from the rod holder assembly 14 to allow the rod holder 12 to freely move about the rotational axis 70 during use. In this case, the user may allow the third detent pin 54 to hang freely from the chain or string 67.

Figure 9:
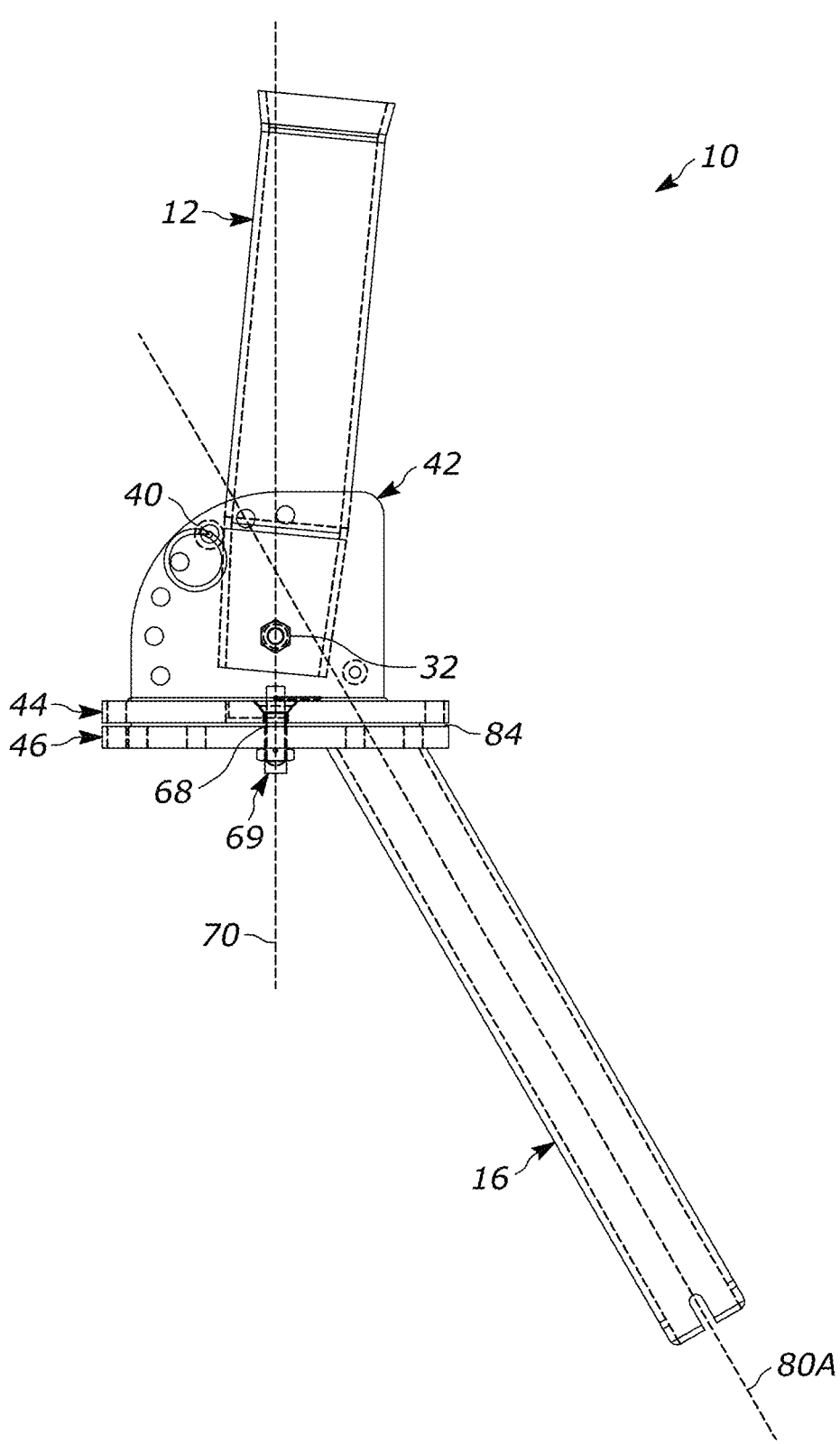
FIG. 9 shows a cross-sectional view of a gunnel gimbal, in accordance with the present disclosure.
Figure 10:
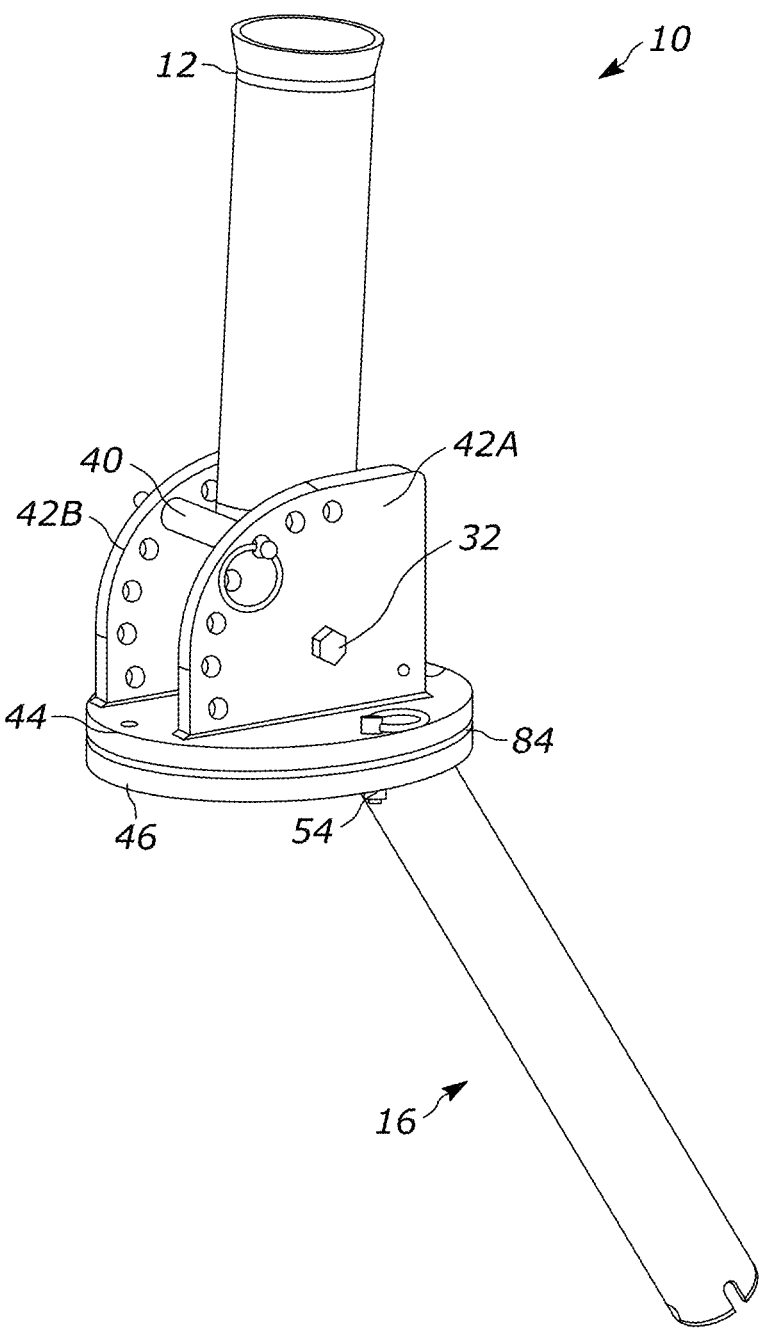
FIG. 10 shows a perspective view of the gunnel gimbal of FIG. 9, in accordance with the present disclosure.
Figure 11:
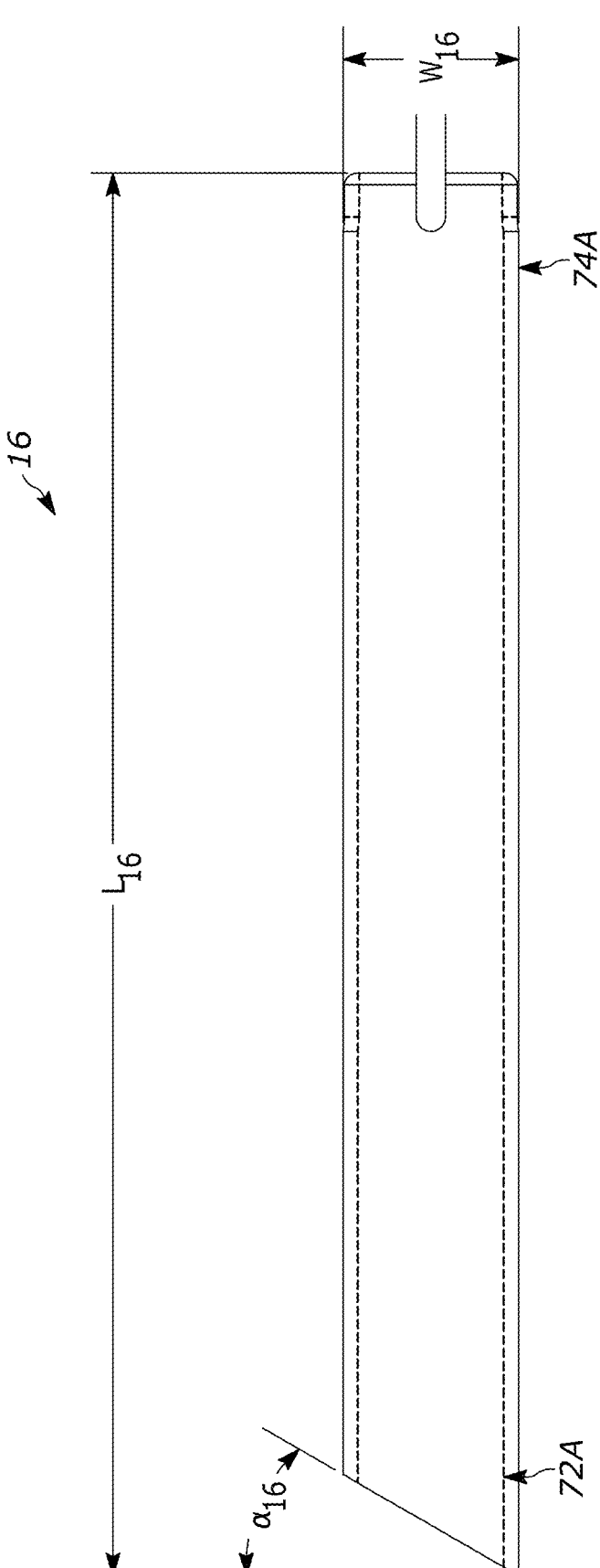
FIG. 11 shows a side view of a mounting arm configured for use as a component of the gunnel gimbal of FIG. 9.

Referring now to FIGS. 9-11, a gunnel gimbal 10A (fishing pole holder device) is shown. FIG. 9 shows a cross-sectional view; FIG. 10 shows a perspective view; and FIG. 11 shows a side view of a mounting arm 16A configured for use as a component of the gunnel gimbal 10A. The gunnel gimbal 10A shown in FIGS. 9 and 10 is substantially the same as that shown in FIGS. 1-8 and, accordingly, the same reference numbers are used to represent corresponding elements.

Continuing to refer to FIGS. 9-11, in some embodiments the gunnel gimbal 10A includes a spacer 84 between the upper rotational plate 44 and the lower rotational plate 46. In one embodiment, the spacer 84 is coupled to or adhered to the lower rotational plate 46. Alternatively, in one embodiment the spacer 84 is coupled to or adhered to the upper rotational plate 44. In one non-limiting example, the spacer 84 has a thickness of approximately ¹/₁₆ inch. In one embodiment, the spacer 84 is composed of nylon, nylon thermoplastic, polypropylene, and/or other suitable materials that are rigid or semi-rigid, durable, and allow for free rotation of the upper rotational plate 44 relative to the lower rotational plate 46 when the gunnel gimbal 10 is assembled. In one embodiment, the spacer 84 has a diameter that is less than a diameter of the upper rotational plate 44 and/or the lower rotational plate 46, such that the spacer 84 does not extend over the plurality of first rotation fixing point apertures 52 and/or the plurality of second rotation fixing point apertures 66. In another embodiment, the spacer 84 includes a plurality of apertures that are arranged and configured to align with the apertures 50, 52, 64, and/or 66 of the upper rotational plate 44 and the lower rotational plate 46.

Continuing to refer to FIGS. 9-11, in one embodiment the mounting arm 16A lies along a single longitudinal axis 80A, unlike the mounting arm 16 shown in FIGS. 1-8 that has a bent configuration. Additionally, in one embodiment the mounting arm 16A is coupled to the lower rotational plate 46 at a location that is offset from the center point of the lower rotational plate 46. In one embodiment, a first end of the mounting arm 16A is coupled to the lower rotational plate 46 at a location that is opposite a direction of free pivoting of the rod holder 12. In one embodiment, the mounting arm 16A is fixedly coupled to the lower face 62B of the lower rotational plate 46, such as by welding, chemical bonding, or the like. Alternatively, in one embodiment the lower rotational plate 46 and the mounting arm 16A are manufactured or formed as a single, unitary piece.

Continuing to refer to FIGS. 9-11, in one embodiment the mounting arm 16A is coupled to or extends from the lower rotational plate 46 along a longitudinal axis 80A that is oriented at an angle to the rotational axis 70. In one embodiment, the longitudinal axis 80A is parallel to and/or otherwise substantially similar to the longitudinal axis 80 shown and described in FIGS. 9-11, but extends directly from the lower rotational plate 46. In one embodiment, as shown in FIG. 11, the first end 72A of the mounting arm 16A is beveled to allow the mounting arm 16A to meet (and, in some embodiments, to be joined to) the lower rotational plate 46 at an angle $\alpha_{16}$. In one embodiment, the angle $\alpha_{16}$ is approximately 30° (±10°) from the plane in which the lower rotational plate 46 lies. In one non-limiting example, the mounting arm 16A has a length $L_{16}$ that is approximately 12 inches (±2.0 inches) and a width $W_{16}$ that is approximately 1.5 inches (±0.5 inch). However, other suitable dimensions may be used, depending on variables such as the size of the fishing rod, the size/dimensions of the fishing rod tube into which the gunnel gimbal is inserted, configuration of the mounting surface, and/or other considerations. in one embodiment, the second end 74A of the mounting arm 16A includes one or more notches to help secure the gunnel gimbal 10A within, for example, a fishing rod tube that is recessed within a boat gunnel.

Thus, the gunnel gimbal 10, 10A provides for both pivotal and rotational movement of a fishing rod during use and also allows a user to optionally secure the fishing rod at any of a number of positions. The gunnel gimbal may also be used as a fish-fighting aid, as the rod holder assembly allows the fishing rod to track the direction of the fish. As discussed herein, the gunnel gimbal is sized and configured to be easily mounted or secured to or within a fishing rod holder, including, but not limited to, a recessed fishing rod holder that is built into a boat gunnel. However, in other embodiments, the gunnel gimbal may be configured as a stand-alone device that includes a stand or base that allows the gunnel gimbal to be used without being mounted or secured to or within a fishing rod holder (for example, to allow the gunnel gimbal to be used from a dock, seawall, deck of a boat, or other surface).

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A fishing rod holder device, the fishing rod holder device comprising:

a rod holder, the rod holder being configured to pivot about a pivotal axis, the rod holder including an elongate body having a tubular shape and including:

a first end, the first end having at least one pivotal axis aperture and a fixing element having an aperture; and a second end opposite the first end, the second end being a free end;

a rod holder assembly, the rod holder being pivotably coupled to the rod holder assembly, the rod holder assembly including:

an upper rotational plate, the upper rotational plate including a planar base portion, a first upright plate extending upward from the base portion, and a second upright plate extending upward from the base portion, the first upright plate and the second upright plate being at least substantially parallel to each other, each of the first upright plate and the second upright plate having a plurality of pivot fixing point apertures, the base portion including a first rotation fixing point aperture; and a lower rotational plate, the upper rotational plate being coupled to the lower rotational plate and being movable relative to the lower rotational plate about a rotational axis, the rotational axis extending through a center point of each of the upper rotational plate and the lower rotational plate, the lower rotational plate including a plurality of second rotation fixing point apertures;

a mounting arm, the mounting arm being fixedly coupled to the lower rotational plate; and a pivot point fixing detent pin, the rod holder being secured at a pivotal position of the rod holder about the pivotal axis when the pivot fixing detent pin is positioned within the aperture of the fixing element, one of the plurality of fixing point apertures of the first upright plate, and one of the plurality of pivot fixing point apertures of the second upright plate.

2. The fishing rod holder device of claim 1, wherein the elongate body has a tubular shape and the second end of the elongate body has an opening, the elongate body including a chamber extending between the first end and the second end, the opening of the second end being in communication with the chamber.

3. The fishing rod holder device of claim 1, wherein the base portion lies in a first plane and each of the first upright plate and the second upright plate extend in a plane that is at least substantially orthogonal to the base portion.

4. The fishing rod holder device of claim 1, wherein the upper rotational plate includes:

a first coupling aperture at a center point of the base portion, the first rotation fixing point aperture being radially offset from the center point.

5. The fishing rod holder device of claim 4, wherein the lower rotational plate includes:

a second coupling aperture at a center point of the lower rotational plate, the first rotation fixing point aperture being configured to be aligned with any of the plurality of second rotation fixing point apertures depending on a rotational position of the upper rotational plate relative to the lower rotational plate.

6. The fishing rod holder device of claim 5, wherein the lower rotational plate has a circular shape, the plurality of second rotation fixing point apertures being arranged around in a circle proximate an edge of the lower rotational plate.

7. The fishing rod holder device of claim 5, further comprising a rotation fixing detent pin, the upper rotational plate being rotatable about a rotational axis, wherein the rod holder and the upper rotational plate are secured at a rotational position about the rotational axis when the rotation fixing detent pin is positioned within the first rotation fixing point aperture of the upper rotational plate and one of the plurality of second rotation fixing point apertures of the lower rotational plate.

8. The fishing rod holder device of claim 1, wherein the upper rotational plate and the lower rotational plate are coupled together by a bolt extending through a center point of each of the upper rotational plate and the lower rotational plate.

9. The fishing rod holder device of claim 1, wherein the mounting arm includes a first portion having a first longitudinal axis and a second portion having a second longitudinal axis, the second longitudinal axis being different than the first longitudinal axis.

10. The fishing rod holder device of claim 9, wherein the second longitudinal axis is oriented at an angle to the first longitudinal axis, the angle being approximately 150°.

11. The fishing rod holder device of claim 10, wherein the first portion is fixedly connected to the lower rotational plate, such that the upper rotational plate is rotatable relative to the lower rotational plate and the mounting arm.

12. The fishing rod holder device of claim 9, wherein:

the second longitudinal axis is oriented at an angle to the first longitudinal axis, the angle being between approximately 110° and approximately 160°.

13. A fishing rod holder device, the fishing rod holder device comprising:

a rod holder, the rod holder being configured to pivot about a pivotal axis, the rod holder including an elongate body that includes:

a first end having at least one pivotal axis aperture and a fixing element having an aperture; and a second end opposite the first end, the second end being a free end;

a rod holder assembly, the rod holder being pivotably coupled to the rod holder assembly, the rod holder assembly including:

an upper rotational plate, the upper rotational plate including a planar base portion, a first upright plate extending upward from the base portion, and a second upright plate extending upward from the base portion, the first upright plate and the second upright plate being parallel to each other, each of the first upright plate and the second upright plate having a plurality of pivot fixing point apertures, the rod holder being pivotably coupled between the first upright plate and the second upright plate via a first detent pin extending through the at least one pivotal axis aperture of the elongate body, the base portion including a first rotation fixing point aperture; and a lower rotational plate, the upper rotational plate being coupled to the lower rotational plate and being movable relative to the lower rotational plate about a rotational axis, the rotational axis extending through a center point of each of the upper rotational plate and the lower rotational plate, the lower rotational plate including a plurality of second rotation fixing point apertures; and a mounting arm, the mounting arm being fixedly coupled to the lower rotational plate, the rod holder being secured at a pivotal position about the pivotal axis via a second detent pin extending through one of the plurality of pivot fixing point apertures of the first upright plate, the aperture of the fixing element, and one of the plurality of pivot fixing point apertures of the second upright plate; and the rod holder and the upper rotational plate are secured at a rotational position about the rotational axis via a third detent pin extending through the first rotation fixing point aperture of the upper rotational plate and one of the plurality of second rotation fixing point apertures of the lower rotational plate.

14. A fishing rod holder device, the fishing rod holder device comprising:

a rod holder, the rod holder being configured to pivot about a pivotal axis, the rod holder including an elongate body, the elongate body including:

a first end, the first end having at least one pivotal axis aperture and a fixing element having an aperture; and a second end opposite the first end, the second end being a free end;

a rod holder assembly, the rod holder being pivotably coupled to the rod holder assembly, the rod holder assembly including:

an upper rotational plate, the upper rotational plate including a planar base portion, a first upright plate extending upward from the base portion, and a second upright plate extending upward from the base portion, the first upright plate and the second upright plate being parallel to each other, each of the first upright plate and the second upright plate having a plurality of pivot fixing point apertures, the base portion including a first rotation fixing point aper- ture, the upper rotational plate further including a first coupling aperture at a center point of the base portion, the first rotation fixing point aperture being radially offset from the center point; and a lower rotational plate, the upper rotational plate being rotationally coupled to the lower rotational plate and being movable relative to the lower rotational plate about a rotational axis, the rotational axis extending through a center point of each of the upper rotational plate and the lower rotational plate, the lower rota- tional plate including a plurality of second rotation fixing point apertures, the lower rotational plate further including a second coupling aperture at a center point of the lower rotational plate, the first rotation fixing point aperture being configured to be aligned with any of the plurality of second rotation fixing point apertures depending on a rotational position of the upper rotational plate relative to the lower rotational plate, the lower rotational plate having a circular shape, the plurality of second rotation fixing point apertures being arranged in a circle proximate an edge of the lower rotational plate; and a mounting arm, the mounting arm being fixedly coupled to the lower rotational plate.

\*   \*   \*   \*   \*